(12) United States Patent
Staton et al.

(10) Patent No.: US 8,692,777 B2
(45) Date of Patent: Apr. 8, 2014

(54) METHOD FOR RAPIDLY TESTING CAPACITANCE SENSING ARRAY FAULT CONDITIONS USING A FLOATING CONDUCTOR

(75) Inventors: Kenneth Lawrence Staton, San Carlos, CA (US); Richard Wei Kwang Lim, Cupertino, CA (US)

(73) Assignee: Apple Inc., Cupertino, CA (US)

(*) Notice: Subject to any disclaimer, the term of this patent is extended or adjusted under 35 U.S.C. 154(b) by 1284 days.

(21) Appl. No.: 12/238,326

(22) Filed: Sep. 25, 2008

(65) Prior Publication Data

US 2009/0250268 A1    Oct. 8, 2009

Related U.S. Application Data

(60) Provisional application No. 61/027,321, filed on Feb. 8, 2008.

(51) Int. Cl.
| G06F 3/041 | (2006.01) |
| G01R 31/00 | (2006.01) |
| G01R 31/08 | (2006.01) |
| G01R 31/312 | (2006.01) |

(52) U.S. Cl.
USPC .......... 345/173; 345/178; 178/18.02; 702/59; 324/519; 324/750.17

(58) Field of Classification Search
USPC ............ 345/156, 173–179; 178/18.01–19.03; 702/57–59, 64–65, 108, 117; 324/500, 324/509, 512, 515, 519, 527, 324/750.16–750.18, 750.22, 750.24; 714/25
See application file for complete search history.

(56) References Cited

U.S. PATENT DOCUMENTS

| 4,577,057 A | * | 3/1986 | Blesser .................... 178/19.01 |
| 5,483,261 A | | 1/1996 | Yasutake |
| 5,488,204 A | | 1/1996 | Mead et al. |
| 5,825,352 A | | 10/1998 | Bisset et al. |

(Continued)

FOREIGN PATENT DOCUMENTS

| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Bipin Shalwala
*Assistant Examiner* — Keith Crawley
(74) *Attorney, Agent, or Firm* — Morrison & Foerster LLP (57) ABSTRACT

The testing of a multi-touch sensor panel for opens and shorts on its drive and sense lines is disclosed by placing a substantially ungrounded conductor diagonally over the touch sensor panel so that at least a portion of every drive line and every sense line is covered by the substantially ungrounded conductor. Pixels under the substantially ungrounded conductor can have strongly positive pixels, while pixels outside the substantially ungrounded conductor can have negative pixels. With the substantially ungrounded conductor in place, a backdrop of negative pixels is formed, and an image of touch can be obtained. By analyzing the image of touch, any opens and shorts on the drive and sense lines, any shorts between a drive and a sense line, or any open drive and sense lines can be quickly identified against the backdrop of negative pixels.

38 Claims, 9 Drawing Sheets

(56) References Cited

U.S. PATENT DOCUMENTS

| | | | |
|---|---|---|---|
| 5,835,079 | A | 11/1998 | Shieh |
| 5,880,411 | A | 3/1999 | Gillespie et al. |
| 6,188,391 | B1 | 2/2001 | Sealy et al. |
| 6,310,610 | B1 | 10/2001 | Beaton et al. |
| 6,323,846 | B1 | 11/2001 | Westerman et al. |
| 6,545,486 | B2 * | 4/2003 | Lane et al. ............ 324/537 |
| 6,600,325 | B2 * | 7/2003 | Coates et al. ............ 324/519 |
| 6,690,387 | B2 | 2/2004 | Zimmerman et al. |
| 7,015,894 | B2 | 3/2006 | Morohoshi |
| 7,133,793 | B2 * | 11/2006 | Ely et al. ............ 702/104 |
| 7,184,064 | B2 | 2/2007 | Zimmerman et al. |
| 7,466,161 | B2 * | 12/2008 | Gardner et al. ............ 324/760.01 |
| 7,663,607 | B2 | 2/2010 | Hotelling et al. |
| 8,514,203 | B2 * | 8/2013 | Staton et al. ............ 345/178 |
| 2006/0026521 | A1 | 2/2006 | Hotelling et al. |
| 2006/0097991 | A1 | 5/2006 | Hotelling et al. |
| 2006/0197752 | A1 * | 9/2006 | Hurst et al. ............ 345/173 |
| 2006/0197753 | A1 | 9/2006 | Hotelling |
| 2008/0068229 | A1 * | 3/2008 | Chuang ............ 341/34 |
| 2008/0158172 | A1 | 7/2008 | Hotelling et al. |
| 2008/0158174 | A1 * | 7/2008 | Land et al. ............ 345/173 |
| 2008/0278453 | A1 * | 11/2008 | Reynolds et al. ............ 345/173 |
| 2009/0025987 | A1 * | 1/2009 | Perski et al. ............ 178/18.03 |
| 2009/0040189 | A1 * | 2/2009 | Lee ............ 345/173 |
| 2010/0253641 | A1 * | 10/2010 | Swedin ............ 345/173 |
| 2011/0175823 | A1 * | 7/2011 | Vieta ............ 345/173 |
| 2012/0188197 | A1 * | 7/2012 | Uzelac et al. ............ 345/174 |
| 2013/0069905 | A1 * | 3/2013 | Krah et al. ............ 345/174 |
| 2013/0222324 | A1 * | 8/2013 | Yousefpor et al. ............ 345/174 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

METHOD FOR RAPIDLY TESTING CAPACITANCE SENSING ARRAY FAULT CONDITIONS USING A FLOATING CONDUCTOR

CROSS-REFERENCE TO RELATED APPLICATIONS

This application claims the benefit of U.S. Provisional Patent Application No. 61/027,321 filed on Feb. 8, 2008, the contents of which are incorporated herein by reference in their entirety for all purposes.

FIELD OF THE INVENTION

This relates to multi-touch sensor panels that utilize an array of capacitive sensors (pixels) to detect and localize touch events, and more particularly, to the efficient testing of multi-touch sensor panels to identify fault conditions.

BACKGROUND OF THE INVENTION

Many types of input devices are presently available for performing operations in a computing system, such as buttons or keys, mice, trackballs, touch sensor panels, joysticks, touch screens and the like. Touch screens, in particular, are becoming increasingly popular because of their ease and versatility of operation as well as their declining price. Touch screens can include a touch sensor panel, which can be a clear panel with a touch-sensitive surface, and a display device that can be positioned behind the panel so that the touch-sensitive surface can substantially cover the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Touch sensor panels can be formed from a matrix of drive lines and sense lines, with sensors (pixels) located where the drive and sense lines cross over each other while being separated by a dielectric material or, in embodiments wherein the drive and sense lines are formed on the same side of a substrate, where the drive and sense lines are adjacent or nearly adjacent to each other. Touch sensors can also be arranged in any number of dimensions and orientations, including diagonal, concentric circle, and three-dimensional and random orientations. In order to scan a touch sensor panel and compute an image of touch, one or more frequencies can be used to stimulate one or more drive lines of the touch sensor panel (with the other drive lines being held at a fixed potential), and charge amplifiers (a.k.a. sense amplifiers) coupled to the sense lines can be configured to detect the amount of charge being coupled onto the sense lines. The outputs of the sense amplifiers, representing pixel output values, can be used in calculations to determine an image of touch for the touch sensor panel. Touch sensor panels capable of detecting either single-touch events or multiple touch events and determining an image of touch are described in Applicant's co-pending U.S. application Ser. No. 11/649,998 entitled "Proximity and Multi-Touch Sensor Detection and Demodulation," filed on Jan. 3, 2007, the contents of which are incorporated by reference herein in their entirety for all purposes.

Before a touch sensor panel can be installed in a device, it is preferable to perform tests to at least ensure that there are no drive lines shorted together or open, and that no sense lines are shorted together or open. Conventional devices used to test touch sensor panels require a special fixture capable of supporting only the touch sensor panel and performing tests for shorts or opens on the drive and sense lines. To test for continuity (opens), conventional testing methods probe both ends of each line. Thus, for a touch sensor panel having N drive lines and M sense lines, a total of N×M tests must be performed just to test continuity. To test for shorts, each drive line is tested against every other drive line, and each sense line is tested against every other sense line. For P total lines, this can require P*(P−1)/2 tests. Alternatively or additionally, when the touch sensor panel is coupled to a subsystem circuit board via a flex circuit, a so-called "bed of nails" text fixture can be used to perform electrical tests on the subsystem circuit board, and while doing so, indirectly test for shorts between drive lines and shorts between sense lines on the touch sensor panel. In either case, because of the number of tests that are required, these types of tests can be very time consuming.

SUMMARY OF THE INVENTION

This relates to testing of a multi-touch sensor panel for opens and shorts on its drive and sense lines by placing a substantially ungrounded conductor diagonally over the touch sensor panel so that at least a portion of a plurality of drive and sense lines are covered by the substantially ungrounded conductor. The conductor can be insulated from the touch sensor panel and chassis ground. Due to the properties of the touch sensor panel, pixels under the substantially ungrounded conductor can have strongly positive pixel output values (strongly positive pixels), while pixels outside the substantially ungrounded conductor can have negative pixel output values (negative pixels). By placing a substantially ungrounded conductor diagonally across the touch sensor panel, a coupling mechanism is created where shorts and opens manifest themselves as large signal changes as compared to the rest of the pixel output values.

With the substantially ungrounded conductor in place, a backdrop of negative pixels is formed, and an image of touch can be obtained. Faults in the touch sensor panel such as opens or shorts can be contrasted and identified against the backdrop of the negative pixels. Shorts between drive lines, shorts between sense lines, open drive lines and open sense lines can all generate strongly positive pixels that can be detected when compared to the nominal negative pixels in other areas. Shorts between drive and sense lines, which create strongly negative pixels, can be detected even as compared to the expected negative pixel values. Thus, by analyzing the image of touch, any opens and shorts on the drive and sense lines, any shorts between a drive and a sense line, or any open drive and sense lines can be quickly identified.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This relates to testing of a multi-touch sensor panel for opens and shorts on its drive and sense lines by placing a substantially ungrounded conductor diagonally over the touch sensor panel so that a plurality of drive and sense lines are covered at some point by the substantially ungrounded conductor. With the substantially ungrounded conductor in place, an image of touch can be obtained. Due to the properties of the touch sensor panel, pixels under the substantially ungrounded conductor can have strongly positive pixel output values (strongly positive pixels), while pixels outside the substantially ungrounded conductor can have negative pixel output values (negative pixels). Faults in the touch sensor panel such as opens or shorts can be identified against the backdrop of the negative pixels. Thus, by analyzing the image of touch, any opens and shorts on the drive and sense lines, any shorts between a drive and a sense line, or any open drive and sense lines can be quickly identified.

Although embodiments of the invention may be described herein in the context of testing touch sensor panels having drive and sense lines that cross over each other orthogonally while being separated by a dielectric material, it should be understood that embodiments of the invention are not so limited, but extend to the testing of touch sensor panels having non-orthogonal arrangements and also to touch sensor panels having drive and sense lines adjacent to each other on the same side of a single substrate. Additionally, although embodiments of the invention may be described herein in the context of testing touch sensor panels that receive only a single stimulation signal on a single drive line at any time, it should be understood that embodiments of the invention are not so limited, but extend to touch sensor panels that receive stimulation signals on multiple drive lines at the same time.

Figure 1A:
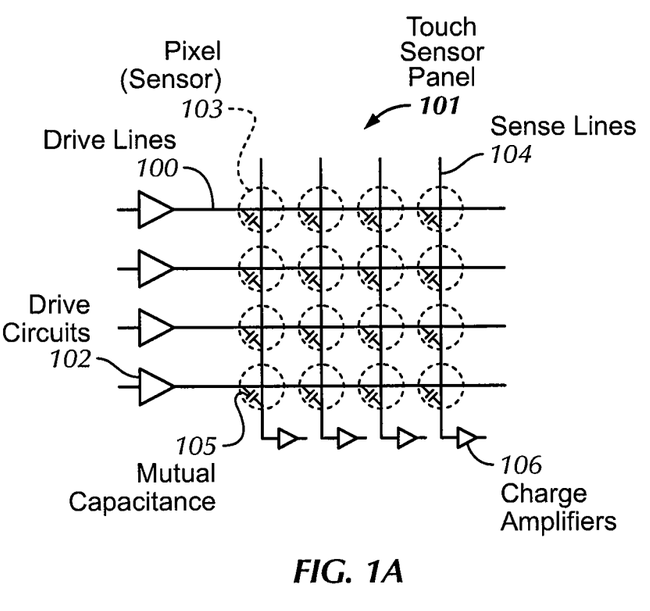
FIG. 1a illustrates an exemplary touch sensor panel having an array of sensors (pixels) formed from a plurality of drive lines and a plurality of sense lines.

FIG. 1a illustrates an exemplary touch sensor panel 101 having an array of sensors 103 that can be formed from a plurality of drive lines 100 and a plurality of sense lines 104. Drive lines (e.g. rows) 100 can be driven by stimulation signals from drive circuits 102. Because a mutual capacitance 105 can be formed between drive lines 100 and sense lines 104 (e.g. columns) at their crossing points (separated from each other by a dielectric), charge from the drive lines can be coupled onto the sense lines, where charge amplifiers 106 detect the charge and generate pixel output values indicative of the amount of touch detected at a particular pixel. In general, the larger the pixel output value, the more touch was detected.

Figure 1B:
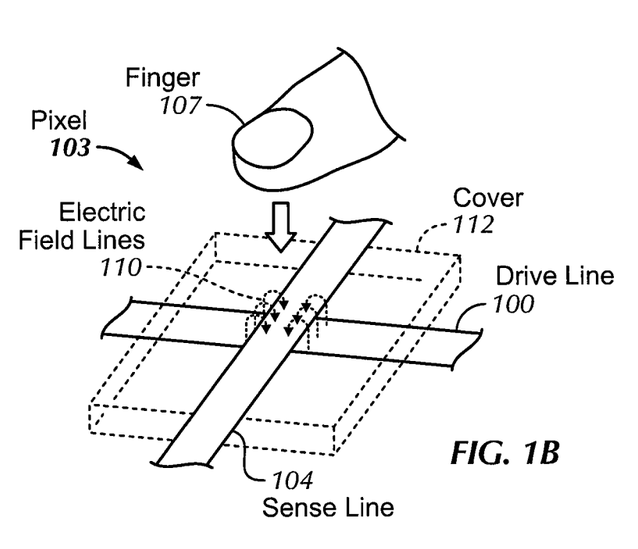
FIG. 1b illustrates a close-up of a single exemplary pixel formed from a drive line and a sense line and a finger touching down over the pixel.

FIG. 1b illustrates a close-up of a single exemplary sensor (a.k.a. electrode or pixel) 103 formed from drive line 100 and sense line 104 and finger 107 touching down over pixel 103. Fringing electric field lines can be formed between drive line 100 and sense line 104. Some electric field lines 110 can extend above cover 112, which is located above the sensor array. When finger 107 or other object touches down over pixel 103, the finger blocks some of the electric field lines 110 extending above cover 112, and thus affects the charge coupled onto sense line 104.

Figure 2A:
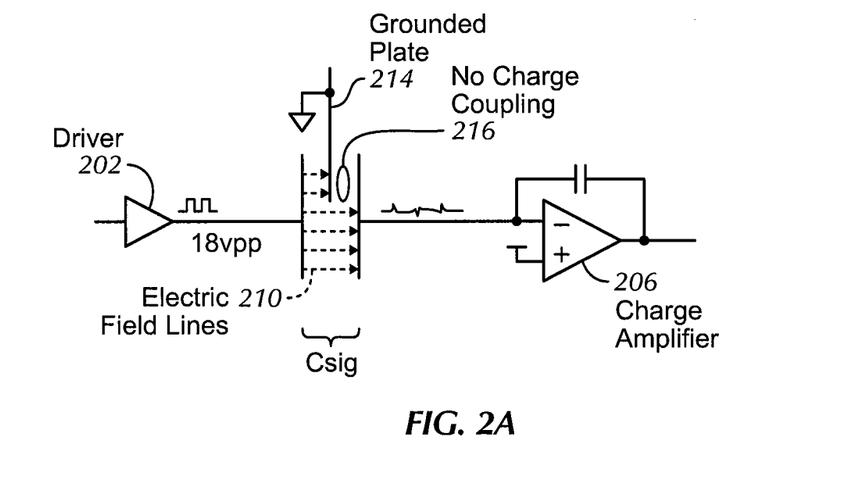
FIG. 2a illustrates an exemplary equivalent electrical circuit corresponding to FIG. 1b in which the finger is grounded to a device that includes a touch sensor panel.

FIG. 2a illustrates an exemplary equivalent electrical circuit corresponding to FIG. 1b in which the finger is grounded by touching a bezel, backside, etc. of a device that includes the touch sensor panel. In FIG. 2a, driver 202 can apply a stimulation signal (e.g. an 18Vpp signal) across mutual capacitance Csig formed by the pixel, and charge amplifier 206 can detect the charge coupled across Csig. In FIG. 2a, because the finger is grounded, the finger can be represented conceptually as grounded plate 214 being inserted between the parallel plates of Csig, with the left plate representing the drive line and the right plate representing the sense line. Grounded plate 214 can block some of the electric field lines 210 flowing from the left plate to the right plate. Because blocked electric field lines 210 can be shunted to ground through the grounded finger, virtually no charge is coupled through to the sense column (see 216) for the blocked electric field lines 210.

Figure 2B:
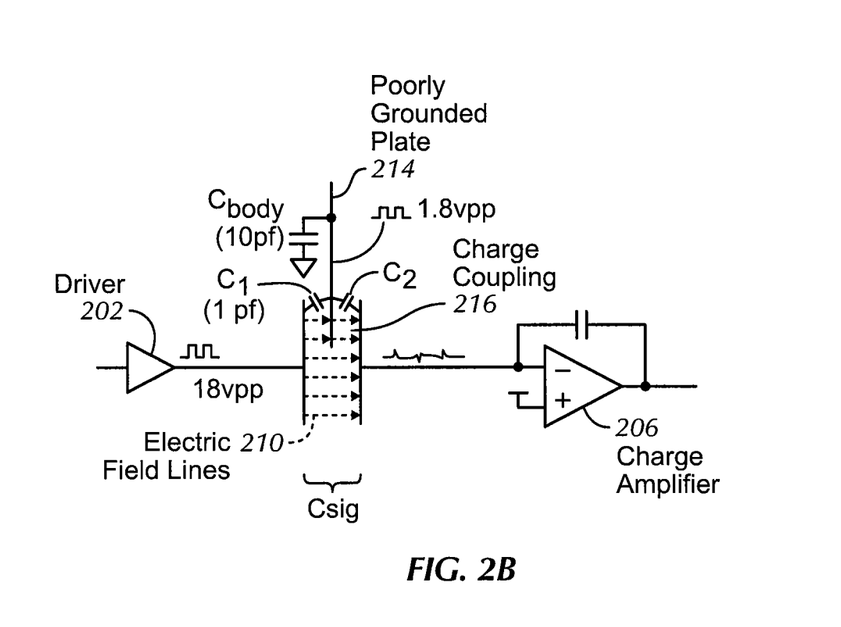
FIG. 2b illustrates an exemplary equivalent electrical circuit corresponding to FIG. 1b in which the finger is floating or otherwise poorly grounded to a device that includes a touch sensor panel.

FIG. 2*b* illustrates an exemplary equivalent electrical circuit corresponding to FIG. 1*b* in which the finger is floating, isolated or otherwise not grounded or poorly grounded (referred to herein as "substantially ungrounded") to the bezel, backside, etc. of the device that includes the touch sensor panel (as might occur if the user touched the touch sensor panel surface without picking up the device). In this situation, the finger can be capacitively coupled to the device through a capacitance Cbody of about 10-100 pF, which is a function of the area of the person and the area of the device. Furthermore, if the device is connected to a docking station, for example, this also increases the effective area of the device and therefore changes the capacitance. In FIG. 2*b*, driver 202 can apply a stimulation signal (e.g. an 18Vpp signal) across mutual capacitance Csig formed by the pixel, and charge amplifier 206 can detect the charge coupled across Csig. In FIG. 2*b*, because the finger is isolated, the finger can be represented conceptually as a plate 214 being inserted between the parallel plates of Csig, with the left plate of Csig representing the drive line and the right plate representing the sense line. Because the finger is isolated, the plate has a capacitance Cbody to ground of about 10-100 pF. The capacitively coupled plate 214 forms a capacitance C1 with respect to the sense line and blocks some of the field lines 210, but instead of shunting the charge to ground, a capacitance C2 to the sense line is also formed. Thus, there is some charge coupling onto the sense line (see 216), and there is a small voltage signal coupled onto the finger. For example, if the stimulation signal is 18Vpp and Cbody is 10 pF, about 1.8Vpp can appear on the finger. The result of this charge coupling through the finger and onto the sense line is that the effect of a finger touch is reduced. The finger attenuates the amount of charge coupled onto the sense line, but some charge is still coupled through.

Figure 3:
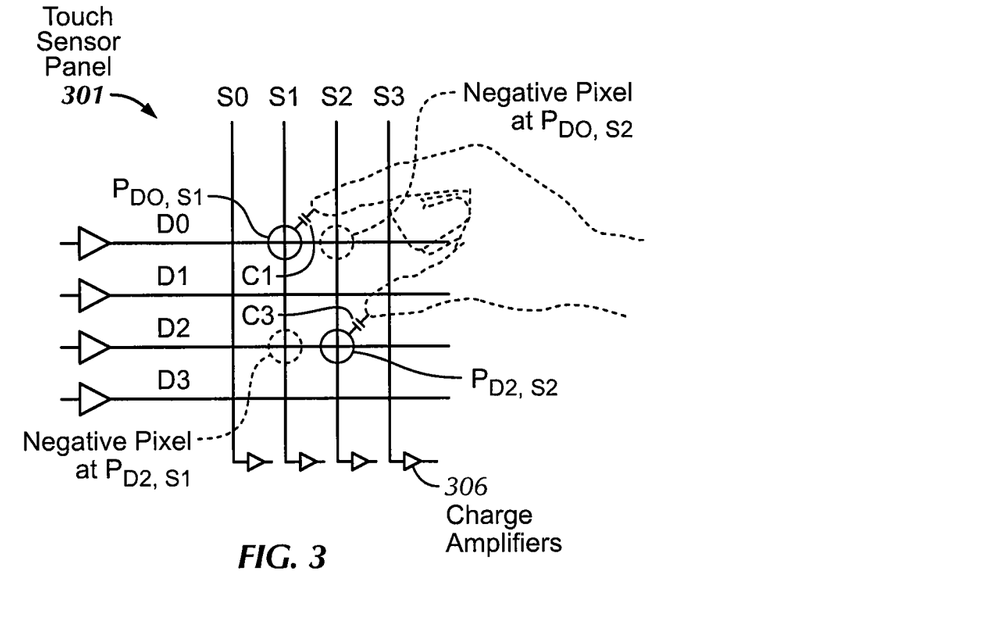
FIG. 3 illustrates an exemplary touch sensor panel experiencing two simultaneous touch events that produce a so-called "negative pixel" effect.

FIG. 3 illustrates an exemplary touch sensor panel 301 such as that shown in FIG. 1*a*, with drives lines identified as D0-D3 and sense lines identified as S0-S3. In the example of FIG. 3, two fingers have touched down over two different spots on the sensor panel, at the pixel intersected by D0 and S1 ($P_{D0,S1}$) and at the pixel intersected by D2 and S2 ($P_{D2,S2}$). Alternatively, the same effect can be generated by a substantially ungrounded conductor placed down diagonally on the touch sensor panel and covering $P_{D0,S1}$ and $P_{D2,S2}$.

In one example, if the fingers (or the conductor) are grounded as described above, most or all of electric field lines that exit the cover above both pixels are blocked, little or no charge is coupled through to the sense lines S1 and S2, and therefore there is little or no error in the measured touch output value S of the pixels. In other words, charge amplifiers 306 connected to each of the sense lines S0-S2 are able to fully detect the touch events. Furthermore, little or no error is introduced into the measured touch output value S of other adjacent pixels.

However, in another example, where the fingers (or conductor) are isolated (substantially ungrounded) and D0 is being stimulated, charge from $P_{D0,S1}$ is coupled onto the finger (or conductor) touching down over $P_{D0,S1}$, but rather than being shunted to ground an attenuated waveform appears on the finger (or conductor). The attenuated signal (and therefore some charge) is coupled back onto sense line S1, and is also coupled through the user's other finger (or the conductor) onto sense line S2. If the user (or conductor) was grounded, because D2 is not being stimulated, the finger (or conductor) over $P_{D2,S2}$ would not cause any charge to be coupled onto S2. However, because the fingers (or conductor) are poorly grounded in the present example, some signal and charge is in fact coupled onto S2. In other words, there is a capacitance C1 from the stimulated drive line D0 to one finger (or the conductor), and another capacitance C2 from another finger (or the conductor) to sense line S2, causing charge to be coupled onto S2. The net effect is to increase the charge coupling onto S2 as compared to the case when the user (or conductor) is grounded.

In FIG. 3, the effect of charge coupling back onto S1 and S2 will reduce the apparent touch detected at touch locations $P_{D0,S1}$ and $P_{D2,S2}$, based on the measured touch output values at those locations. In addition, this effect will increase the charge coupling and reduce the output indicative of a touch for pixels outside the touch locations, such as pixel $P_{D0,S2}$. For example, in a normal no-touch condition pixel $P_{D0,S2}$ may see 1.5 pF of mutual capacitance and a charge coupling Qsig of 27 pCpp, and in a grounded finger (or conductor) touch condition that same pixel may see 1.3 pF of mutual capacitance and a charge coupling of 24 pCpp. However, with charge coupling occurring across substantially ungrounded fingers (or across a substantially ungrounded conductor) as described above, the effect on adjacent untouched pixel $P_{D0,S2}$ can be to increase the charge coupling above the normal no-touch condition of 27 pCpp, to 29 pCpp, for example. This amount of charge coupling, when detected by charge amplifier 306, gives the appearance of a so-called "negative pixel" or a negative amount of touch at $P_{D0,S2}$. Pixel $P_{D2,S1}$ can also experience the same negative pixel effect. Note that a negative pixel, as used herein, can include pixels that appear to have a negative amount of touch based on their touch output value, and pixels that have a positive but artificially reduced amount of touch based on their touch output value.

Thus, the effect of charge coupling across substantially ungrounded fingers (or a substantially ungrounded conductor) to other sense lines can weaken not only the pixels being touched, but can also weaken adjacent pixels not being touched and located in the drive line being stimulated, to the point where they produce output readings (negative pixels) indicative of a negative touch. Embodiments of the invention take advantage of this phenomenon. By placing a poorly grounded conductor diagonally across the touch sensor panel, physical defects in the touch sensor panel such as opens or shorts can be easily identified (contrasted) against the baseline formed by the negative pixels. Thus, by analyzing the image of touch, any opens and shorts on the drive and sense lines of the touch sensor panel can be quickly identified.

Figure 4A:
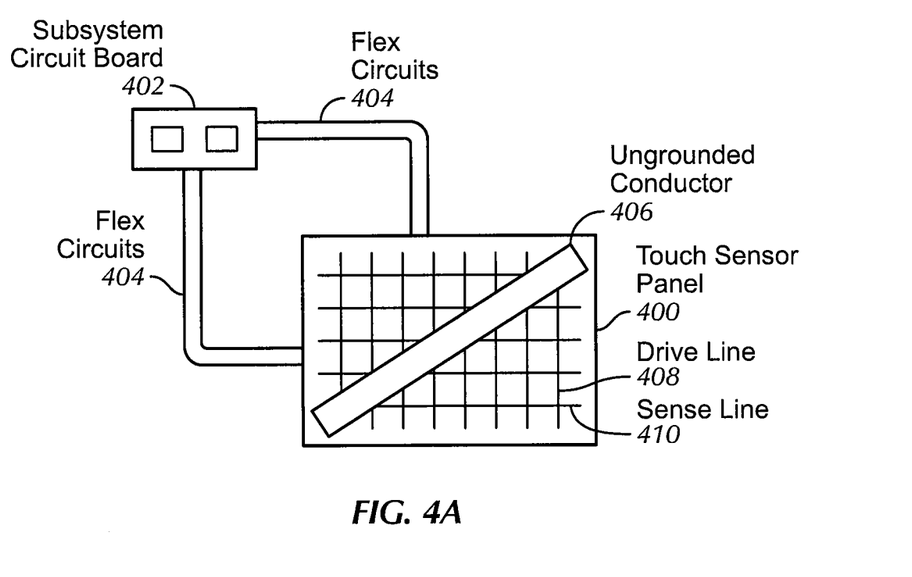
FIG. 4a illustrates an exemplary touch sensor panel coupled to a subsystem circuit board using flex circuits and being tested for shorts and opens utilizing an ungrounded conductor placed diagonally across the touch sensor panel according to one embodiment of this invention.

FIG. 4*a* illustrates exemplary touch sensor panel 400 coupled to a subsystem circuit board 402 using flex circuits 404 and being tested for shorts and opens using substantially ungrounded conductor 406 placed diagonally across the touch sensor panel according to embodiments of the invention. The conductor 406 can be shaped and sized so that it can extend to opposite corners of the touch sensor panel 400. In the example of FIG. 4*a*, a relatively thin substantially ungrounded conductor 406 is placed diagonally over the touch sensor panel so that at least a portion of every drive line 408 and every sense line 410 is covered by the substantially ungrounded conductor. Conductor 406 can be insulated from the touch sensor panel and chassis ground. An image of touch can then be captured by subsystem circuit board 402 and analyzed by a tester. For a touch sensor panel with no shorts or opens, the pixels under substantially ungrounded conductor 406 will be positive, and the pixels outside the substantially ungrounded conductor will be negative.

Figure 4B:
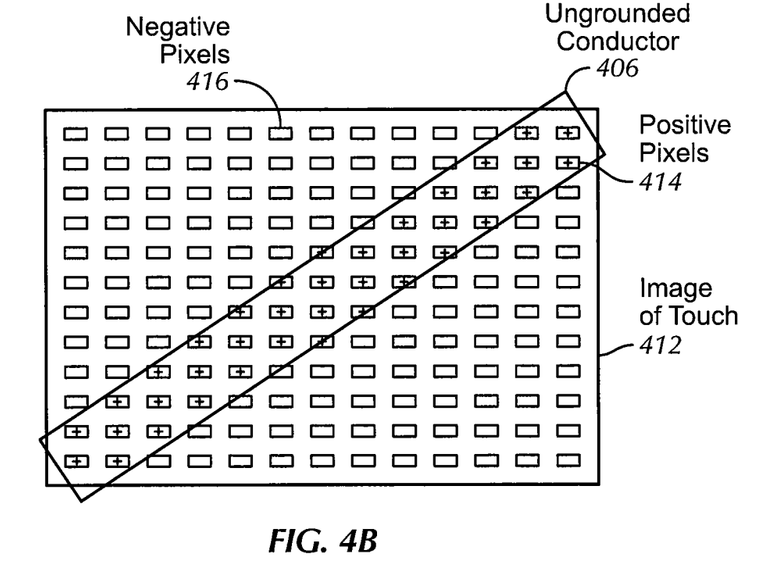
FIG. 4b illustrates an exemplary image of touch captured from a touch sensor panel without faults and having an ungrounded conductor placed diagonally over the touch sensor panel according to one embodiment of this invention.

FIG. 4b illustrates exemplary image of touch 412 captured from a touch sensor panel without drive and sense line faults and having substantially ungrounded conductor 406 placed diagonally over the touch sensor panel according to embodiments of the invention. In the example of FIG. 4b, positive pixels 414 appear under substantially ungrounded conductor 406, while negative pixels 416 appear outside the substantially ungrounded conductor.

The negative pixel effect can make it easier to detect drive and sense line faults. Placing a substantially ungrounded conductor diagonally across the touch sensor panel can create a coupling mechanism where shorts and opens have large signal changes as compared to the rest of the pixel output values. Shorts between drive lines, shorts between sense lines, open drive lines and open sense lines can all generate strongly positive pixels that can be easily detected when compared to the nominal negative pixels in other areas. Shorts between drive and sense lines, which create strongly negative pixels, can be detected even as compared to the expected negative pixel values.

Figure 5A:
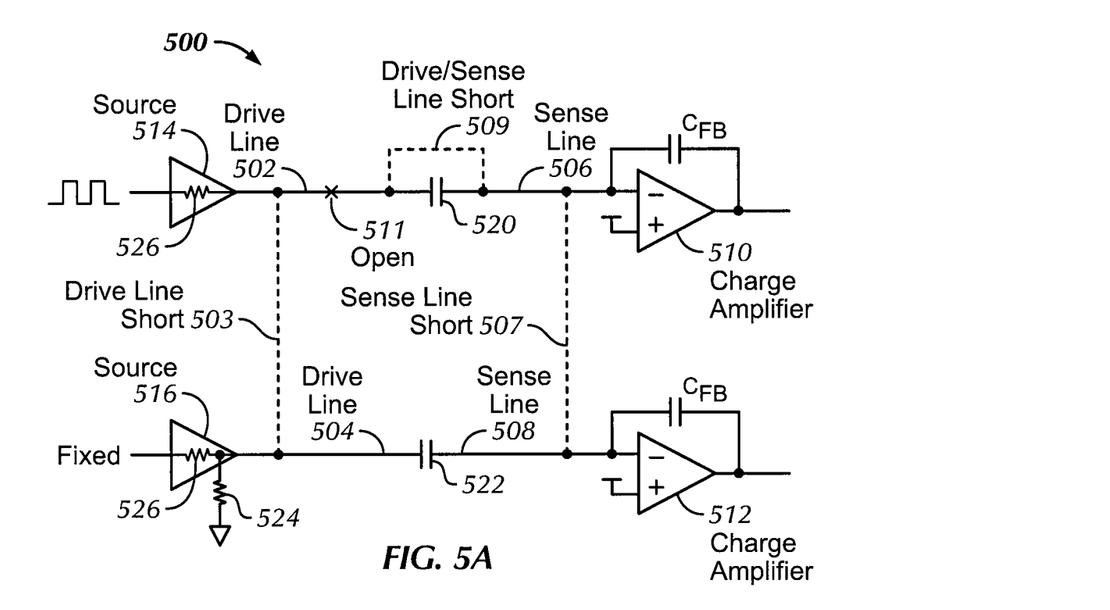
FIG. 5a illustrates an exemplary equivalent circuit for two drive lines, two sense lines, and two sense amplifiers coupled to each of the sense lines illustrating the effects of shorts and opens.

FIG. 5a illustrates exemplary equivalent circuit 500 for two drive lines 502 and 504, two sense lines 506 and 508, and two sense amplifiers 510 and 512 coupled to each of the sense lines illustrating the effects of shorts and opens. In the example of FIG. 5a, stimulation sources 514 and 516 having a certain source impedance 526 (e.g. 100 ohms) are coupled to drive lines 502 and 504, respectively. Capacitance 520 is formed across the pixel formed by drive line 502 and sense line 506, while capacitance 522 is formed across the pixel formed by drive line 504 and 508. In some touch sensor panels, one drive line (e.g. drive line 502) is stimulated by a stimulation signal (e.g. source 514) while all other drive lines (e.g. drive line 504) are held at ground or a fixed potential. When source 516 is maintained at ground, for example, source 516 can appear to be a resistance 524 (e.g. 100 ohms) to ground.

If a short 503 is present between drive lines 502 and 504, source 514 is shunted to ground through resistance 524. Because of the extra load, only about half the normal stimulation signal is present on drive line 502 (and also onto drive line 504 due to the short), and thus the amount of charge coupled across capacitance 520 and 522 can be reduced by about half from the amount of charge coupling that would have been present across capacitance 520 had there been no short. The result is strongly positive pixel output values for every pixel in the two shorted drive lines.

Figure 5B:
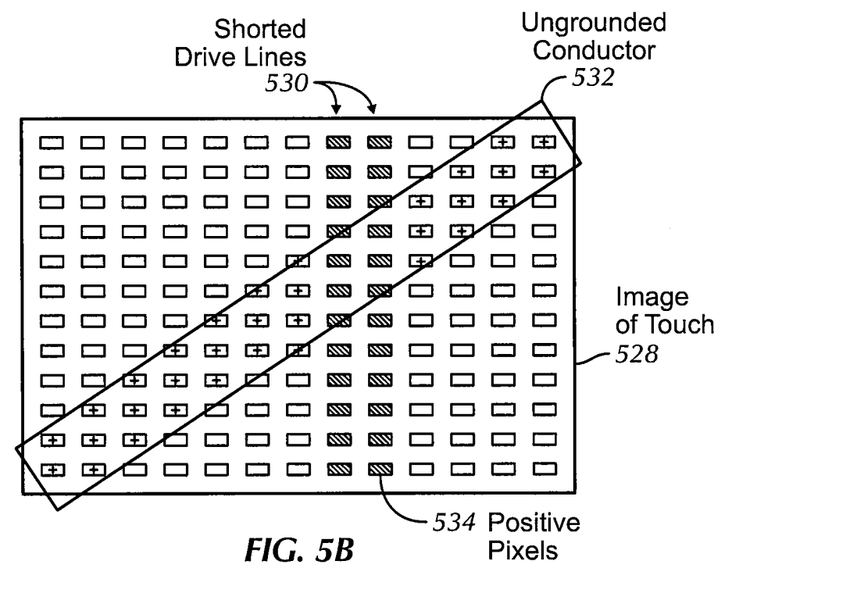
FIG. 5b illustrates an exemplary image of touch captured from a touch sensor panel with two shorted drive lines and having an ungrounded conductor placed diagonally over the touch sensor panel according to one embodiment of this invention.

FIG. 5b illustrates an exemplary image of touch 528 captured from a touch sensor panel with two shorted drive lines 530 and having substantially ungrounded conductor 532 placed diagonally over the touch sensor panel according to embodiments of the invention. In the example of FIG. 5b, positive pixels 534 appear under the two shorted drive lines 530.

Referring again to FIG. 5a, if a short 507 is present between sense lines 506 and 508, the charge being coupled across capacitance 520 is seen by both sense amplifiers 510 and 512, and about half the current flows across Cfb in each sense amplifier as compared to the no-short situation. Accordingly, it can appear that the amount of charge being coupled onto sense lines 506 and 508 is reduced by about half from the amount of charge coupling that would have been present had both drive lines 502 and 504 been driven and there had been no short. The result is strongly positive pixel output values for every pixel in the two shorted sense lines.

Figure 5C:
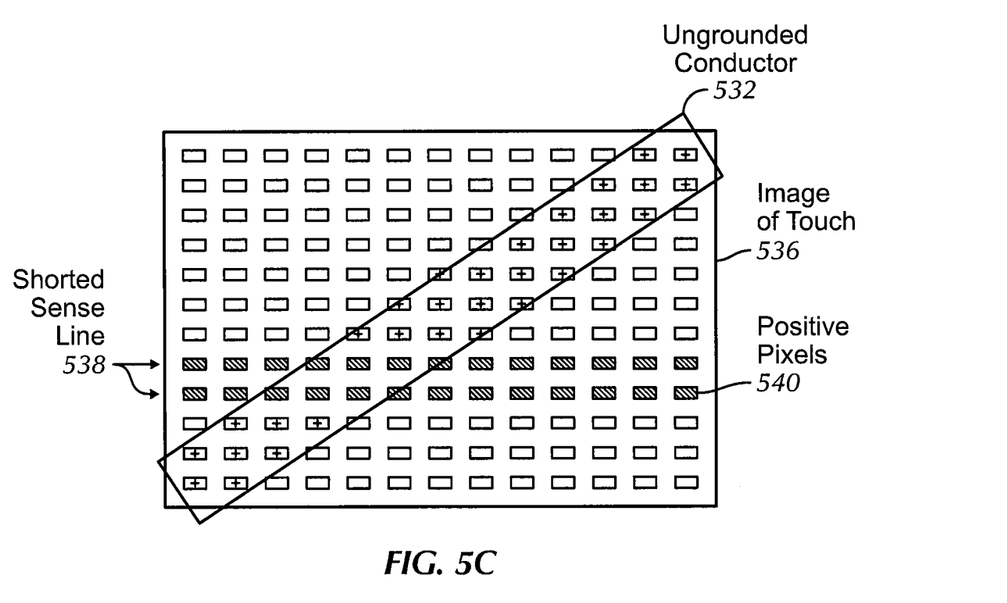
FIG. 5c illustrates an exemplary image of touch captured from a touch sensor panel with two shorted sense lines and having an ungrounded conductor placed diagonally over the touch sensor panel according to one embodiment of this invention.

FIG. 5c illustrates an exemplary image of touch 536 captured from a touch sensor panel with two shorted sense lines 538 and having substantially grounded conductor 532 placed diagonally over the touch sensor panel according to embodiments of the invention. In the example of FIG. 5c, positive pixels 540 appear under the two shorted sense lines 538.

Referring again to FIG. 5a, if a short 509 is present between drive line 502 and sense line 506, capacitance 520 is essentially eliminated, and source 514 directly drives sense amplifier 510. The charge coupled into the negative input of sense amplifier 510 will be much larger than nominal, and the sense amplifier can become saturated. The result is a strongly negative pixel output value for every pixel in the shorted sense line.

Figure 5D:
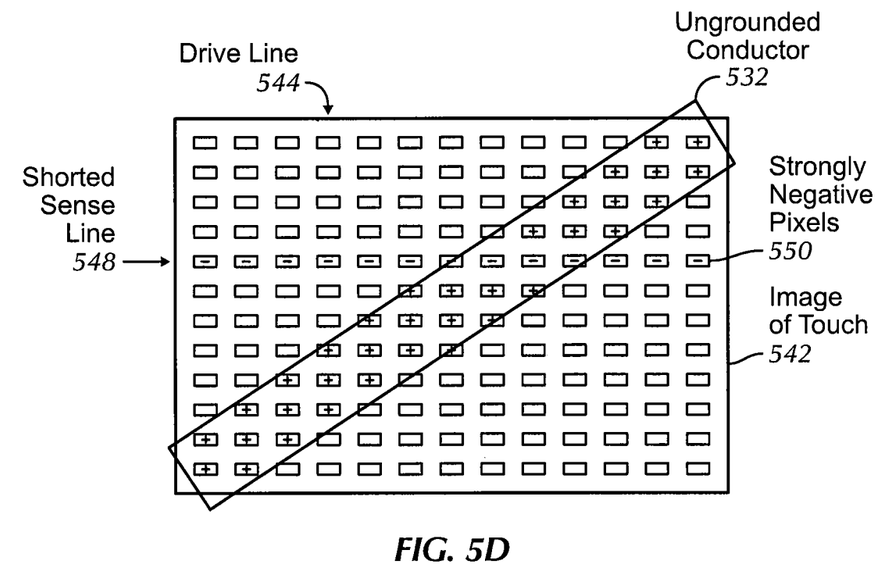
FIG. 5d illustrates an exemplary image of touch captured from a touch sensor panel with a drive line shorted to a sense line and having an ungrounded conductor placed diagonally over the touch sensor panel according to one embodiment of this invention.

FIG. 5d illustrates an exemplary image of touch 542 captured from a touch sensor panel with drive line 544 shorted to sense line 548 and having substantially ungrounded conductor 532 placed diagonally over the touch sensor panel according to embodiments of the invention. In the example of FIG. 5d, strongly negative pixels 550 appear under shorted sense line 548.

Referring again to FIG. 5a, if an open 511 is present on drive line 502, the charge coupled across capacitance 520 will be negligible, and the result is a strongly positive pixel output value for every pixel in the open drive line.

Figure 5E:
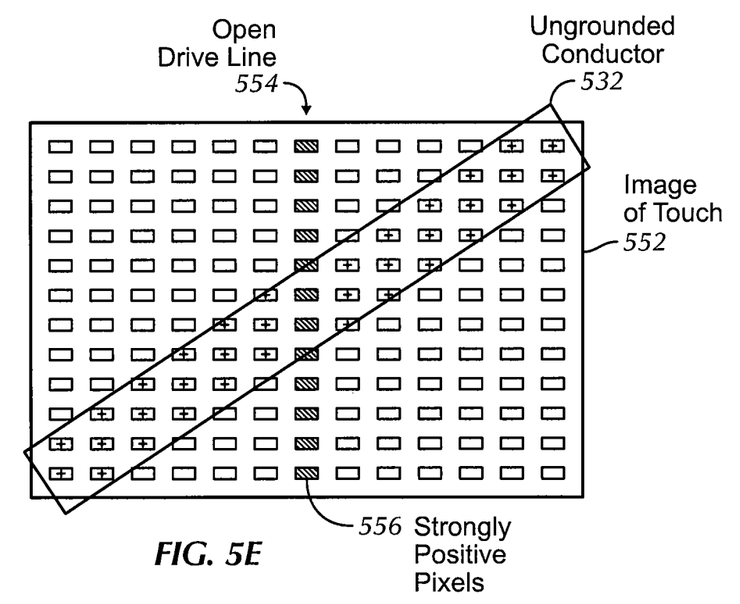
FIG. 5e illustrates an exemplary image of touch captured from a touch sensor panel with an open drive line and having an ungrounded conductor placed diagonally over the touch sensor panel according to one embodiment of this invention.

FIG. 5e illustrates an exemplary image of touch 552 captured from a touch sensor panel with open drive line 554 and having substantially ungrounded conductor 532 placed diagonally over the touch sensor panel according to embodiments of the invention. In the example of FIG. 5e, strongly positive pixels 556 appear under open drive line 554.

Referring again to FIG. 5a, if an open is present on sense line 506, the charge coupled into the negative input of sense amplifier 510 will be negligible, and the result is a strongly negative pixel output value for every pixel in the open sense line.

Figure 5F:
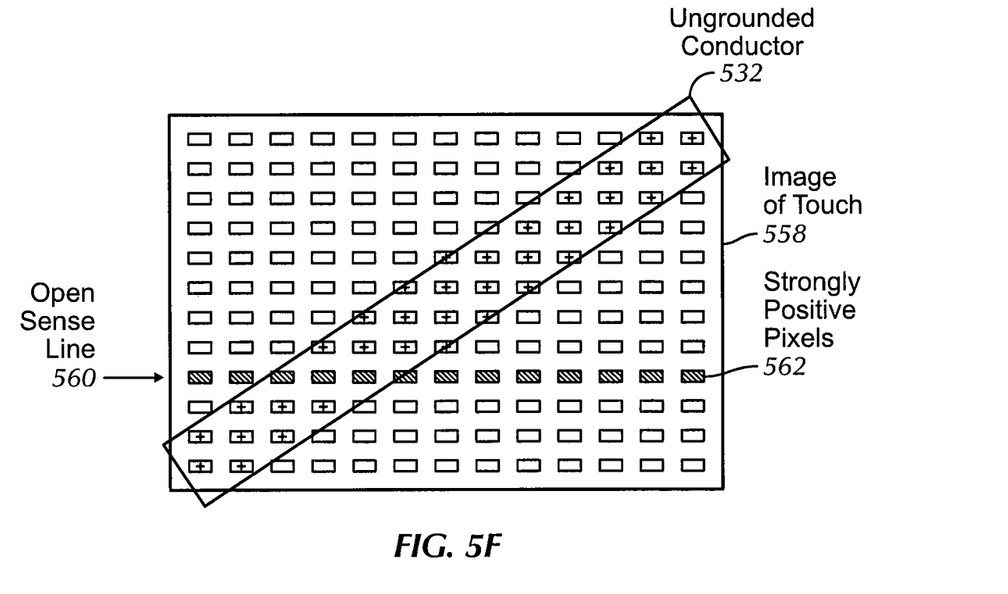
FIG. 5f illustrates an exemplary image of touch captured from a touch sensor panel with an open sense line and having an ungrounded conductor placed diagonally over the touch sensor panel according to one embodiment of this invention.

FIG. 5f illustrates an exemplary image of touch 558 captured from a touch sensor panel with open sense line 560 and having substantially ungrounded conductor 532 placed diagonally over the touch sensor panel according to embodiments of the invention. In the example of FIG. 5f, strongly positive pixels 562 appear under open sense line 560.

Shorts between drive lines, shorts between sense lines, and shorts between drive and sense lines can be detected in any number of ways, such as by comparing the captured image of touch against an expected baseline, or by capturing a histogram of the touch data and determining the locations of anomalous values. In one embodiment, the pixel output values for each drive line can be summed, and the sums for all drive lines can be compared against each other to determine if one or more sums are substantially different from the others. The same approach could be used for the sense lines. Dedicated or programmable test circuitry can be used to perform this data analysis and identify faults in the touch sensor panel.

Figure 6:
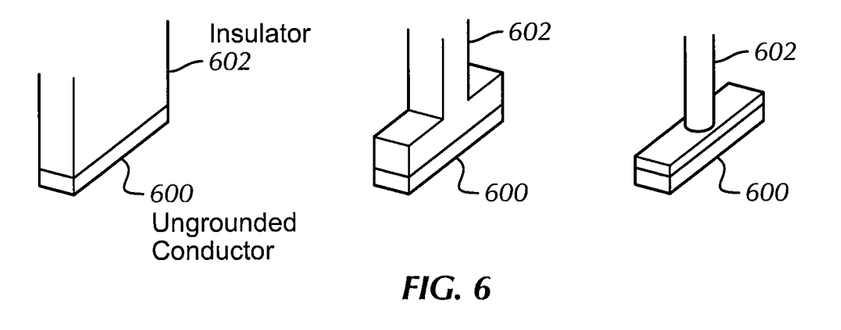
FIG. 6 illustrates several exemplary insulator structures for supporting an ungrounded conductor to be used for fault testing according to embodiments of the invention.

FIG. 6 illustrates several exemplary insulator structures 602 for supporting substantially ungrounded conductor 600 according to embodiments of the invention. The examples of FIG. 6 enable only substantially ungrounded conductor 600 to come near the surface of the touch sensor panel.

Figure 7:
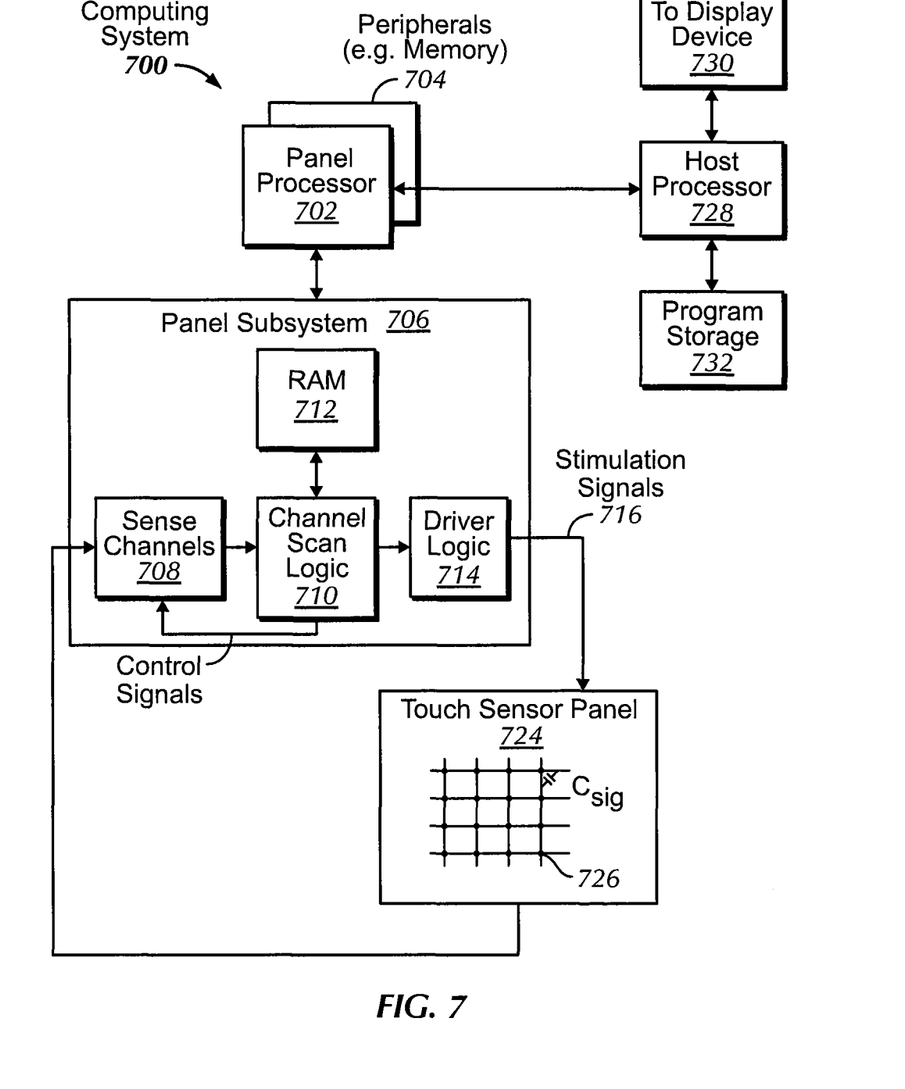
FIG. 7 illustrates an exemplary computing system, some or all of which can be tested or used to identify faults in the touch sensor panel according to one embodiment of this invention.

FIG. 7 illustrates exemplary computing system 700, some or all of which can be tested or used to identify faults in the touch sensor panel according to embodiments of the invention. Computing system 700 can include one or more panel processors 702 and peripherals 704, and panel subsystem 706. Peripherals 704 can include, but are not limited to, random access memory (RAM) or other types of memory or storage, watchdog timers and the like. Panel subsystem 706 can include, but is not limited to, one or more sense channels

708, channel scan logic 710 and driver logic 714. Channel scan logic 710 can access RAM 712, autonomously read data from the sense channels and provide control for the sense channels. In addition, channel scan logic 710 can control driver logic 714 to generate stimulation signals 716 at various frequencies and phases that can be selectively applied to rows of touch sensor panel 724. In some embodiments, panel subsystem 706, panel processor 702 and peripherals 704 can be integrated into a single application specific integrated circuit (ASIC).

Touch sensor panel 724 can include a capacitive sensing medium having a plurality of row traces or driving lines and a plurality of column traces or sensing lines, although other sensing media can also be used. Each intersection of drive and sense lines can represent a capacitive sensing node and can be viewed as picture element (pixel) 726, which can be particularly useful when touch sensor panel 724 is viewed as capturing an "image" of touch. (In other words, after panel subsystem 706 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel)). Each sense line of touch sensor panel 724 can drive sense channel 708 (also referred to herein as an event detection and demodulation circuit) in panel subsystem 706.

In some embodiments, before touch sensor panel 724 is integrated with panel subsystem 706 and panel processor/peripherals 702 and 704, the touch sensor panel can be placed in a test fixture and connected to test circuitry and structures that can place a substantially ungrounded conductor diagonally across the touch sensor panel, stimulate the panel, and obtain an image of touch. In such a test system, the test circuitry can then analyze the image of touch to determine faults in touch sensor panel 724. In other embodiments, after touch sensor panel 724 is integrated with panel subsystem 706 and panel processor/peripherals 702 and 704, the integrated system can be placed in a test fixture and connected to test circuitry and other structures that can place a substantially ungrounded conductor diagonally across the touch sensor panel and stimulate the panel. In such a test system, the test circuitry can then read the image of touch from panel subsystem 706, panel processor 702 and peripherals 704, and analyze the image of touch to determine faults in touch sensor panel 724. In still further embodiments, computing system 700 can perform some or all of the processing needed to determine faults. For example, panel processor 702 can execute firmware to analyze the image of touch to determine faults in touch sensor panel 724.

Computing system 700 can also include host processor 728 for receiving outputs from panel processor 702 such as fault notifications and performing actions based on the outputs that can include, but are not limited to, providing a fault indication to appear on a touch screen incorporating the touch sensor panel. In normal operation, panel processor 702 can perform actions such as moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 728 can also perform additional functions that may not be related to panel processing, and can be coupled to program storage 732 and display device 730 such as an LCD display for providing a UI to a user of the device.

The analysis of the image of touch described above for detecting faults in the touch sensor panel can be performed by firmware stored in memory and executed by a processor in the test circuitry of a test system, or alternatively, in computing system 700. The firmware can also be stored and transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any storage medium that can contain, store, communicate, propagate, or transport the program for use by or in connection with the instruction execution system, apparatus, or device. The computer readable storage medium can include, but is not limited to, an electronic, magnetic, optical, electromagnetic, infrared, or semiconductor system, apparatus, device, or propagation medium. A computer-readable storage medium can include, but is not limited to, an electrical connection (electronic) having one or more wires, a portable computer diskette (magnetic), a random access memory (RAM) (magnetic), a read-only memory (ROM) (magnetic), an erasable programmable read-only memory (EPROM) (magnetic), an optical fiber (optical), portable optical disc such a CD, CD-R, CD-RW, DVD, DVD-R, or DVD-RW, or flash memory such as compact flash cards, secured digital cards, USB memory devices, memory sticks, and the like.

Figures 8A, 8B, 8C:
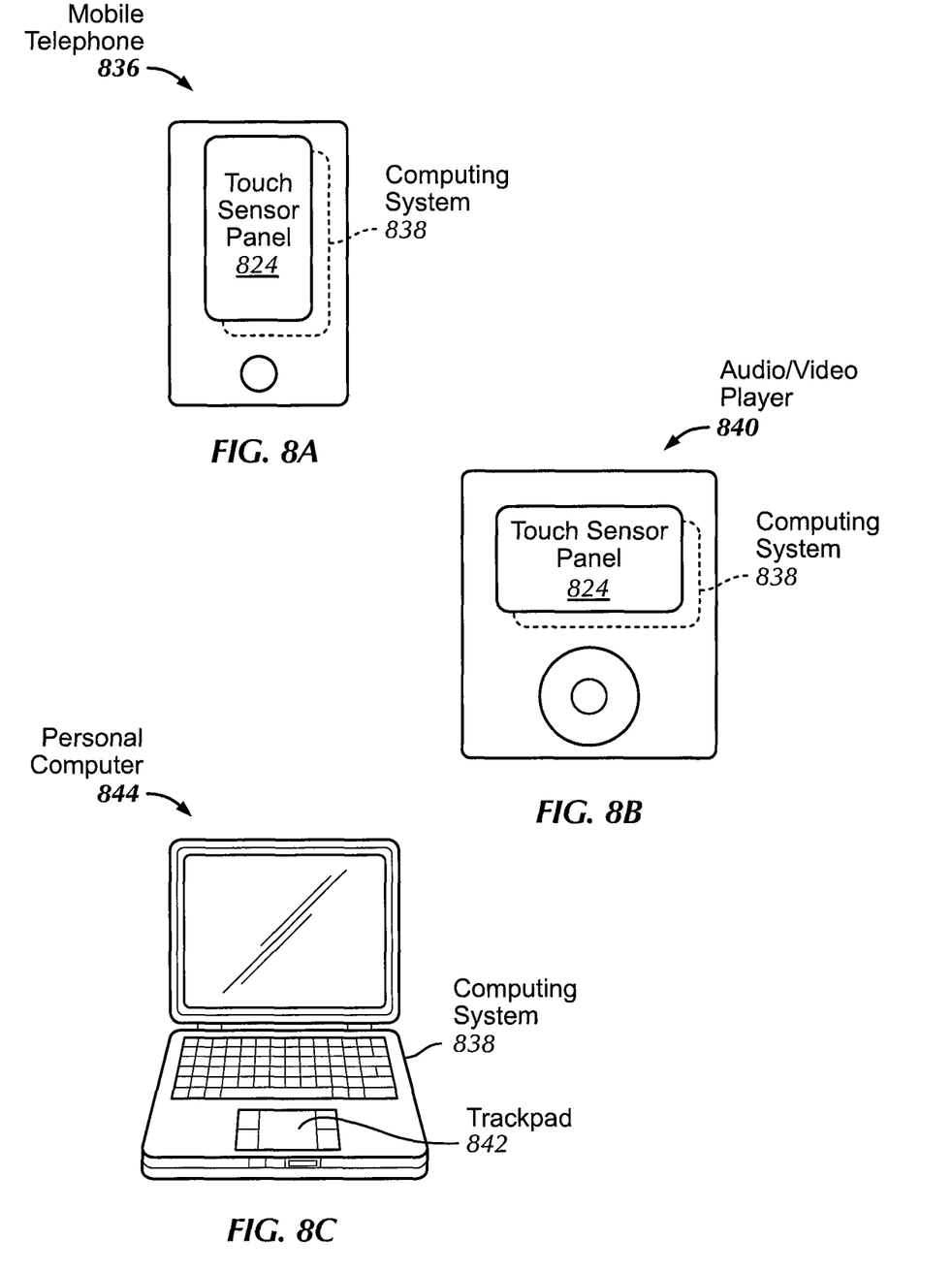
FIG. 8a illustrates an exemplary mobile telephone, some or all of which can be tested to identify faults in the touch sensor panel according to one embodiment of this invention.
FIG. 8b illustrates an exemplary digital audio player, some or all of which can be tested to identify faults in the touch sensor panel according to one embodiment of this invention.
FIG. 8c illustrates an exemplary personal computer, some or all of which can be tested to identify faults in the trackpad according to one embodiment of this invention.

FIG. 8*a* illustrates an exemplary mobile telephone 836 that can include touch sensor panel 824 (e.g. touch sensor panel 101 of FIG. 1) and computing system 838 (e.g. computing system 700 of FIG. 7) including firmware stored in memory, some or all of which can be tested to identify faults in the touch sensor panel according to embodiments of the invention.

FIG. 8*b* illustrates an exemplary digital audio/video player 840 that can include touch sensor panel 824 (e.g. touch sensor panel 101 of FIG. 1) and computing system 838 (e.g. computing system 700 of FIG. 7) including firmware stored in memory, some or all of which can be tested to identify faults in the touch sensor panel according to embodiments of the invention.

FIG. 8*c* illustrates an exemplary personal computer 842 that can include trackpad 824 (e.g. touch sensor panel 101 of FIG. 1) and computing system 838 (e.g. computing system 700 of FIG. 7) including firmware stored in memory, some or all of which can be tested to identify faults in the touch sensor panel according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method for detecting faults in a touch sensor panel, comprising:
   placing a floating conductor diagonally across the touch sensor panel so that a plurality of drive and sense lines in the touch sensor panel are covered by the conductor;
   obtaining an image of touch from the touch sensor panel; and
   analyzing the image of touch to detect any faults in the touch sensor panel.

2. The method of claim 1, further comprising detecting faults by identifying drive or sense lines with strongly positive or strongly negative pixels relative to a baseline of negative pixels.

3. The method of claim 1, further comprising detecting faults by generating a histogram of touch data of the drive and sense lines to identify those drive and sense lines with anomalous pixel values.

4. The method of claim 1, further comprising detecting faults by identifying shorts between drive lines, shorts between sense lines, shorts between a drive and a sense line, open drive lines and open sense lines.

5. The method of claim 4, further comprising identifying shorts between drive lines by locating two or more drive lines with strongly positive pixel values.

6. The method of claim 4, further comprising identifying shorts between sense lines by locating two or more sense lines with strongly positive pixel values.

7. The method of claim 4, further comprising identifying an open drive line by locating a single drive line with strongly positive pixel values.

8. The method of claim 4, further comprising identifying an open sense line by locating a single sense line with strongly positive pixel values.

9. The method of claim 4, further comprising identifying a short between a drive line and a sense line by locating a single sense line with strongly negative pixel values.

10. A method for detecting faults in a touch sensor panel, comprising:
    placing a substantially ungrounded conductor diagonally across the touch sensor panel to generate an expected baseline of negative pixels in an image of touch captured from the touch sensor panel; and
    contrasting an actual image of touch obtained from the touch sensor panel against the expected baseline to detect any faults in the touch sensor panel.

11. The method of claim 10, further comprising detecting faults by identifying drive or sense lines with strongly positive or strongly negative pixels relative to a baseline of negative pixels.

12. The method of claim 10, further comprising detecting faults by generating a histogram of touch data of the drive and sense lines to identify those drive and sense lines with anomalous pixel values.

13. The method of claim 10, further comprising detecting faults by identifying shorts between drive lines, shorts between sense lines, shorts between a drive and a sense line, open drive lines and open sense lines.

14. The method of claim 13, further comprising identifying shorts between drive lines by locating two or more drive lines with strongly positive pixel values.

15. The method of claim 13, further comprising identifying shorts between sense lines by locating two or more sense lines with strongly positive pixel values.

16. The method of claim 13, further comprising identifying an open drive line by locating a single drive line with strongly positive pixel values.

17. The method of claim 13, further comprising identifying an open sense line by locating a single sense line with strongly positive pixel values.

18. The method of claim 13, further comprising identifying a short between a drive line and a sense line by locating a single sense line with strongly negative pixel values.

19. A test system for detecting faults in a touch sensor panel, comprising:
    a support structure coupled to a floating conductor and configured for placing the conductor diagonally across the touch sensor panel so that a plurality of drive and sense lines in the touch sensor panel are covered by the conductor; and
    test circuitry communicatively coupled for receiving an image of touch from the touch sensor panel and configured for analyzing the image of touch to detect any faults in the touch sensor panel.

20. The test system of claim 19, the test circuitry further configured for detecting faults by identifying drive or sense lines with strongly positive or strongly negative pixels relative to a baseline of negative pixels.

21. The test system of claim 19, the test circuitry further configured for detecting faults by generating a histogram of touch data of the drive and sense lines to identify those drive and sense lines with anomalous pixel values.

22. The test system of claim 19, the test circuitry further configured for detecting faults by identifying shorts between drive lines, shorts between sense lines, shorts between a drive and a sense line, open drive lines and open sense lines.

23. The test system of claim 22, the test circuitry further configured for identifying shorts between drive lines by locating two or more drive lines with strongly positive pixel values.

24. The test system of claim 22, the test circuitry further configured for identifying shorts between sense lines by locating two or more sense lines with strongly positive pixel values.

25. The test system of claim 22, the test circuitry further configured for identifying an open drive line by locating a single drive line with strongly positive pixel values.

26. The test system of claim 22, the test circuitry further configured for identifying an open sense line by locating a single sense line with strongly positive pixel values.

27. The test system of claim 22, the test circuitry further configured for identifying a short between a drive line and a sense line by locating a single sense line with strongly negative pixel values.

28. The test system of claim 19, the test circuitry at least partially integrated into a device including the touch sensor panel.

29. An apparatus for detecting faults in a touch sensor panel, comprising:
    test circuitry operatively couplable to a floating conductor configured for placement diagonally across the touch sensor panel, the conductor shaped and sized to extend to opposite corners of the touch sensor panel so that a plurality of drive and sense lines in the touch sensor panel are covered by the conductor, the test circuitry configured for receiving an image of touch from the touch sensor panel and analyzing the image of touch to detect any faults in the touch sensor panel.

30. The apparatus of claim 29, the test circuitry further configured for detecting faults by identifying drive or sense lines with strongly positive or strongly negative pixels relative to a baseline of negative pixels.

31. The apparatus of claim 29, the test circuitry further configured for detecting faults by generating a histogram of touch data of the drive and sense lines to identify those drive and sense lines with anomalous pixel values.

32. The apparatus of claim 29, the test circuitry further configured for detecting faults by identifying shorts between drive lines, shorts between sense lines, shorts between a drive and a sense line, open drive lines and open sense lines.

33. The apparatus of claim 32, the test circuitry further configured for identifying shorts between drive lines by locating two or more drive lines with strongly positive pixel values.

34. The apparatus of claim 32, the test circuitry further configured for identifying shorts between sense lines by locating two or more sense lines with strongly positive pixel values.

35. The apparatus of claim 32, the test circuitry further configured for identifying an open drive line by locating a single drive line with strongly positive pixel values.

36. The apparatus of claim 32, the test circuitry further configured for identifying an open sense line by locating a single sense line with strongly positive pixel values.

37. The apparatus of claim 32, the test circuitry further configured for identifying a short between a drive line and a sense line by locating a single sense line with strongly negative pixel values.

38. The apparatus of claim 32, the test circuitry at least partially integrated into a device including the touch sensor panel.

* * * * *